United States Patent [19]

Shallenberger et al.

[11] Patent Number: 4,664,875

[45] Date of Patent: May 12, 1987

[54] TOP NOZZLE REMOVAL AND REPLACEMENT FIXTURE AND METHOD IN A RECONSTITUTABLE FUEL ASSEMBLY

[75] Inventors: John M. Shallenberger, Fox Chapel; Stephen J. Ferlan, Wilkins Township, Allegheny County, both of Pa.

[73] Assignee: Westinghouse Electric Corp., Pittsburgh, Pa.

[21] Appl. No.: 670,729

[22] Filed: Nov. 13, 1984

[51] Int. Cl.$^4$ .............................................. G21C 19/00
[52] U.S. Cl. ........................................ 376/261; 29/723
[58] Field of Search ................. 376/260, 261, 446; 29/723, 400 N, 720, 721, 256, 259; 414/146

[56] References Cited

U.S. PATENT DOCUMENTS

| | | | |
|---|---|---|---|
| 3,770,583 | 11/1973 | Klumb et al. | 376/261 |
| 3,801,453 | 4/1974 | Jones | 414/146 |
| 3,828,868 | 8/1974 | Jabsen | 376/261 |
| 3,887,980 | 6/1975 | Yates et al. | 29/723 |
| 4,175,000 | 11/1979 | Jabsen | 376/446 |
| 4,208,248 | 6/1980 | Jabsen | 376/446 |
| 4,219,386 | 8/1980 | Osborne et al. | 376/446 |
| 4,358,421 | 11/1982 | Jabsen | 376/271 |
| 4,522,780 | 6/1985 | Shallenberger et al. | 376/260 |
| 4,572,816 | 2/1986 | Gjertsen et al. | 29/400 N |
| 4,575,930 | 3/1986 | Blickenderfer | 376/260 |

FOREIGN PATENT DOCUMENTS

| | | | |
|---|---|---|---|
| 0082892 | 7/1983 | European Pat. Off. | 376/261 |
| 0109902 | 5/1984 | European Pat. Off. | 376/261 |
| 2533065 | 3/1984 | France | 376/261 |

OTHER PUBLICATIONS

"Repairing Fuel For Reinsertion", NEI., pp. 19-20, 23, Bassler et al, 7/85.

Primary Examiner—Deborah L. Kyle
Assistant Examiner—Dan Wasil

[57] ABSTRACT

A fixture for removing a top nozzle of a reconstitutable fuel assembly held in a fixed position within a work station includes a pair of guide openings in two diagonally opposed corners of its base to movably mount the base on a pair of upstanding guide members of the work station and on the top nozzle in alignment therewith. Also, the fixture includes a pair of hollow expandable split sleeves with wedge pins inserted therein which are operable to lock the fixture to the top nozzle. An arrangement of drive and driven gears connected with a plurality of reaction pins mounted on the base of the fixture are operable to move the fixture base with the top nozzle thereto away from the guide thimbles of the fuel assembly and thereby cause the top nozzle adapter plate to release its connection with the guide thimbles. However, prior to removing the top nozzle, a plurality of stop devices of the fixture are preset and operable for establishing a reference representing the distance between the fixture and work station so that the top nozzle can later be replaced at the same axial position on the fuel assembly it was at before removal.

16 Claims, 11 Drawing Figures

TOP NOZZLE REMOVAL AND REPLACEMENT FIXTURE AND METHOD IN A RECONSTITUTABLE FUEL ASSEMBLY

CROSS REFERENCE TO RELATED APPLICATIONS

Reference is hereby made to the following copending applications dealing with related subject matter and assigned to the assignee of the present invention:

1. "Nuclear Reactor Fuel Assembly with a Removable Top Nozzle" by John M. Shallenberger et al, assigned U.S. Ser. No. 644,758 and filed Aug. 27, 1984.

2. "Locking Tube Removal and Replacement Tool and Method in a Reconstitutable Fuel Assembly" by John M. Shallenberger et al, assigned U.S. Ser. No. 670,418 and filed Nov. 9, 1984.

BACKGROUND OF THE INVENTION

1. Field of the Invention

The present invention relates generally to fuel assemblies for nuclear reactors and, more particularly, is concerned with a fixture and method for removing a top nozzle from and replacing it on the upper ends of a plurality of guide thimbles of a reconstitutable fuel assembly.

2. Description of the Prior Art

In most nuclear reactors, the reactor core is comprised of a large number of elongated fuel assemblies. Conventional designs of these fuel assemblies include a plurality of fuel rods and control rod guide thimbles held in an organized array of grids spaced along the fuel assembly length and attached to the control rod guide thimbles. Top and bottom nozzles on opposite ends of the fuel assembly are secured to the guide thimbles which extend slightly above and below the ends of the fuel rods. At the top end of the fuel assembly, the guide thimbles are attached in passageways provided in the adapter plate of the top nozzle. The guide thimbles may each include an upper sleeve for attachment to the top nozzle.

During operation of such fuel assembly in a nuclear reactor, a few of the fuel rods may occasionally develop cracks along their lengths resulting primarily from internal stresses, thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored. Since the fuel rods are part of the integral assembly of guide thimbles welded to the top and bottom nozzles, it is difficult to detect and remove the failed rods.

Until recently, to gain acess to these rods it was necessary to remove the affected assembly from the nuclear reactor core and then break the welds which secure the nozzles to the guide thimbles. In so doing, the destructive action often renders the fuel assembly unfit for further use in the reactor because of the damage done to both the guide thimbles and the nozzle which prohibits rewelding.

In view of the high costs associated with replacing fuel assemblies, considerable interest has arisen in reconstitutable fuel assemblies in order to minimize operating and maintenance expenses. The general approach to making a fuel assembly reconstitutable is to provide it with a removable top nozzle. One reconstitutable fuel assembly construction, devised recently, is illustrated and described in the first U.S. Pat. application cross-referenced above. It incorporates an attaching structure for removably mounting the top nozzle on the upper ends of the control rod guide thimbles.

The attaching structure includes a plurality of outer sockets defined in an adapter plate of the top nozzle, a plurality of inner sockets with each formed on the upper end of one of the guide thimbles, and a plurality of removable locking tubes inserted in the inner sockets to maintain them in locking engagement with the outer sockets. Each outer socket is in the form of a passageway through the adapter plate which has an annular groove. Each inner socket is in the form of a hollow upper end portion of the guide thimble having an annular bulge which seats in the annular groove when the guide thimble end portion is inserted in the adapter plate passageway. A plurality of elongated axial slots are provided in the guide thimble upper end portion to permit inward elastic collapse of the slotted portion so as to allow the larger bulge diameter to be inserted within and removed from the annular circumferential groove in the passageway of the adapter plate. In such manner, the inner socket of the guide thimble is inserted into and withdrawn from locking engagement with the outer socket.

The locking tube is inserted from above the top nozzle into a locking position in the hollow upper end portion of the guide thimble forming the inner socket. When inserted in its locking position, the locking tube retains the bulge of the inner socket in its expanded locking engagement with the annular groove and prevents the inner socket from being moved to a compressed releasing position in which it could be withdrawn from the outer socket. In such manner, the locking tubes maintain the inner sockets in locking engagement with the outer sockets, and thereby the attachment of the top nozzle on the upper ends of the guide thimbles. Furthermore, due to vibration forces and the like, it is desirable to secure the locking tubes in their locking positions. For such purpose, suitable means, such as a pair of bulges, are formed in the upper portion of each locking tube after insertion in its locking position which bulges fit into the circumferential bulge in the upper end portion of the guide thimble.

While the reconstitutable fuel assembly construction briefly described above has demonstrated considerable promise as to measure by which domestic and foreign utilities can minimize both operating and maintenance expenses, a need exists for means to effectively and efficiently carry out removal and replacement of the locking tubes and top nozzle of the reconstitutable fuel assembly so as to enhance commercial acceptance thereof.

SUMMARY OF THE INVENTION

The present invention together with other components, some of which comprise the invention disclosed and claimed in the second U.S. patent application cross-referenced above, provide a system of remotely-operated, submersible equipment designed to satisfy the aforementioned needs. The equipment is operable to remove and subsequently remount or replace the locking tubes and top nozzle of a reconstitutable fuel assembly, such as the one disclosed in the first U. S. patent application cross-referenced above, at a reactor plant. After the locking tubes and top nozzle have been removed, the upper ends of the fuel rods are exposed from the top of the reconstitutable fuel assembly. Thus, access to the fuel rods is gained for any of a variety of purposes: inspecting them for failure, removing and replacing failed rods, transferring partially spent fuel rods from one assembly to another, and/or rearrangement of fuel rods to attain better uranium utilization in the reactor core. Once inspection, removal, replacement and/or rearrangement of the fuel rods is completed, the top nozzle is placed back on the upper ends of the guide thimbles and the locking tubes replaced in their locking positions.

The present invention provides a fixture and method for removing the top nozzle from and replacing it on the guide thimbles in a reconstitutable fuel assembly once the locking tubes have been removed. In particular, the fixture provides for safe, positively controlled removal and replacement of the top nozzle from and onto the slotted upper end portions of the guide thimbles comprising the inner sockets of the top nozzle attaching structure. Not only does the fixture include a gear driven mechanism operable to generate sufficient force to cause the collapse of the slotted upper end portions of the guide thimbles for removal and replacement of the top nozzle thereon, in addition thereto the fixture incorporates stop devices for ensuring that the remounted top nozzle is in precisely the same axial position on the fuel assembly as it was prior to removal. This is an important feature of the fixture because of the potential for fuel assembly damage should the remounted top nozzle be driven down an excessive distance over the upper end portions of the guide thimbles. Because the split or slotted guide thimble upper end portions must be collapsed to a smaller diameter while passing through the passageways in the top nozzle adapter plate (i.e. outer sockets of the top nozzle attaching structure), the fixture must be capable of exerting a force in excess of 100 pounds to remove or replace a top nozzle.

Accordingly, the present invention sets forth for use with a reconstitutable fuel assembly being held in a fixed position within a work station wherein the fuel assembly includes a top nozzle with an adapter plate having at least one passageway, at least one guide thimble with an upper end portion and an attaching structure releasably mating the upper end portion of the guide thimble within the passageway of the top nozzle adapter plate, a fixture and method for removing the top nozzle from and replacing it back onto the guide thimble of the reconstitutable fuel assembly.

The fixture for removing the top nozzle includes: (a) a base; (b) means for movably mounting the base on the work station in alignment with the top nozzle of the fuel assembly; (c) means for locking the top nozzle to the base when the base is movably mounted on the work station; and (d) means for moving the base, and the top nozzle therewith when locked thereto, relative to the work station so as to lift the top nozzle away from the guide thimble and thereby cause release of the attaching structure and removal of the top nozzle from the guide thimble. In addition, the fixture also includes means operable for establishing a reference representing the displacement between the base and the work station when the top nozzle is locked to the base but before the base and top nozzle have been lifted away from the work station for facilitating replacement of the top nozzle back onto the guide thimble at the same axial position on the fuel assembly as it was prior to removal.

The method for removing the top nozzle from the guide thimble includes the operative steps of: (a) movably mounting a fixture on the work station in alignment with the top nozzle of the fuel assembly; (b) locking the top nozzle to a base of the fixture; and (c) moving the base, and the top nozzle therewith when locked thereto, away from the work station so as to lift the top nozzle off the guide thimble and thereby cause release of the attaching structure and removal of the top nozzle from the fuel assmebly. Furthermore, the method also includes the step of establishing a reference representing the displacement between the base of the fixture and the work station when the top nozzle is locked to the base but before the base and top nozzle have been lifted away from the work station for facilitating replacement of the top nozzle back onto the guide thimble at the same axial position on the fuel assembly as it was prior to removal.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRITPION OF THE INVENTION

Figure 1:
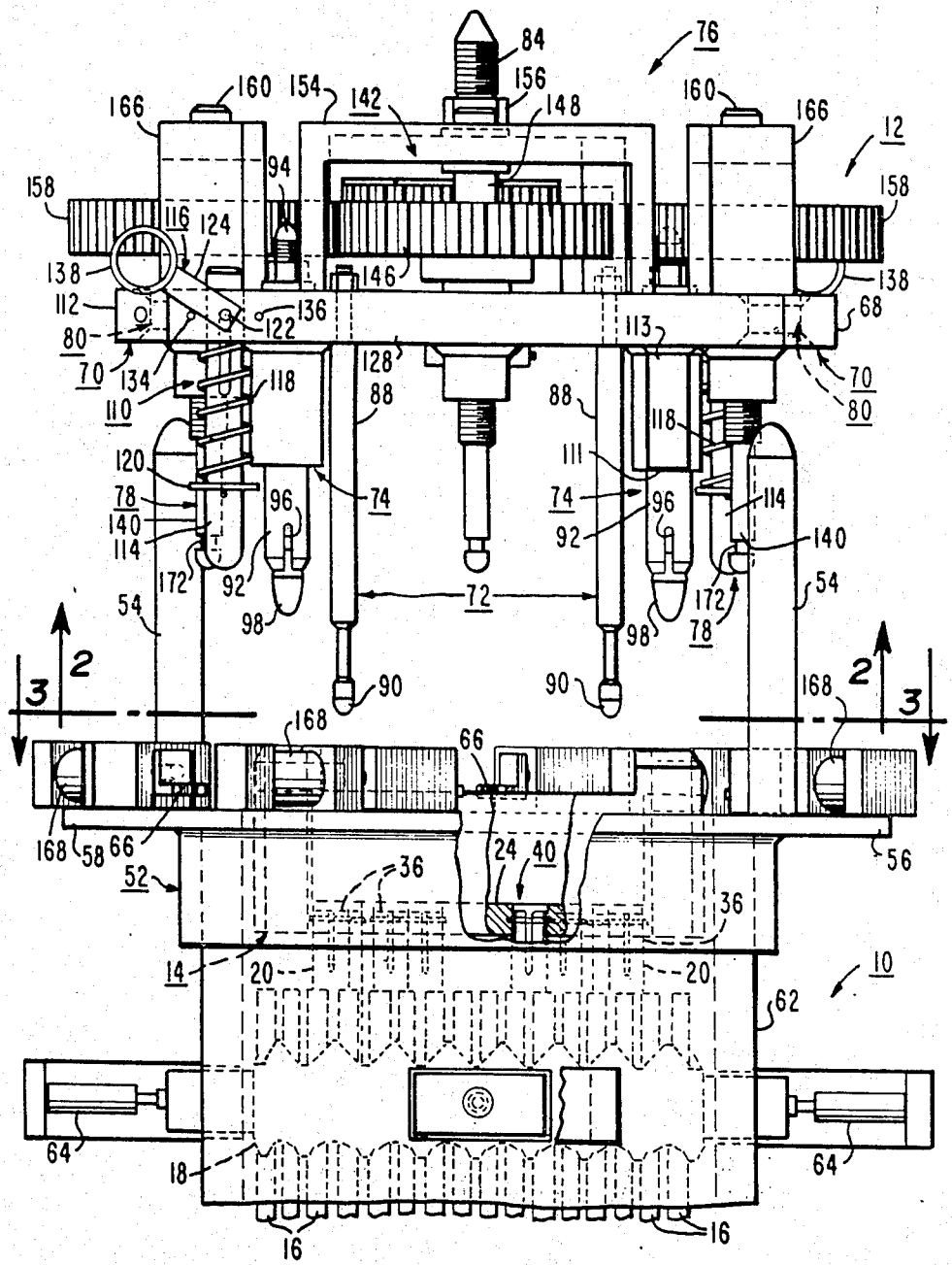
FIG. 1 is a fragmentary side elevational view of the upper end of a reconstitutable fuel assembly, with parts partially sectioned and broken away for purpose of clarity, and of the fixture of the present invention employed in removing the top nozzle from the guide thimbles of the assembly.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an upper end of a reconstitutable fuel assembly, being generally designated by the numberal 10, on which a fixture of the present invention, generally indicated 12, and a tool (not shown) forming the invention of the second cross-referenced patent application are employed in removing and replacing a top nozzle 14 from and onto the fuel assembly 10.

Basically, the fuel assembly 10, being of conventional construction, includes an array of fuel rods 16 held in spaced relationship to one another by a number of grids 18 (only one being shown) spaced along the fuel assembly length. Each fuel rod 16 includes nuclear fuel pellets (not shown) and is sealed at its opposite ends. The fuel pellets composed of fissible material are responsible for creating the reactive power of the nuclear reactor core in which the assembly 10 is placed. A liquid moderator/coolant such as water, or water containing boron, is pumped upwardly through the fuel assemblies of the core in order to extract heat generated therein for the production of useful work.

The reconstitutable fuel assembly 10 also includes a number of longitudinally extending guide tubes or thimbles 20 along which the grids 18 are spaced and to which they are attached. The opposite ends of the guide thimbles 20 extend a short distance past the opposite ends of the fuel rods 16 and are attached respectively to a bottom nozzle (not shown) and the top nozzle 14.

To control the fission process, a number of control rods (not shown) are reciprocally movable in the guide thimbles 20 located at predetermined positions in the fuel assembly 10. Specifically, the top nozzle 14 includes a rod cluster control mechanism (not shown) interconnected to the control rods and operable to move the control rods vertically in the guide thimbles 20 to thereby control the fission process in the fuel assembly 10, all in a well-known manner.

As illustrated in FIG. 1, and also in FIGS. 3 and 8-11, the top nozzle 14 comprises a housing 22 having a lower adapter plate 24 surrounded by four interconnected, upstanding side walls 26 with raised sets of pads 28,30 (only one pad in each set being shown) located respectively at pairs of diagonal corners 32,34 formed by the side walls 26. The control rod guide thimbles 20 have their uppermost end portions 36 coaxially positioned within control rod passageways 38 formed through the adapter plate 24 of the top nozzle 14. For gaining access to the fuel rods 16, the adapter plate 24 of the top nozzle 14 is removably connected to the upper end portions 36 of the guide thimbles 20 by an attaching structure, generally designated 40. The attaching structure 40 will be described herein to the extent necessary to facilitate an understanding of the structure and operation of the fixture 12 comprising the present invention. However, a more thorough understanding of the attaching structure 40 can be gained from the first patent application cross-referenced above, the disclosure of which is incorporated herein by reference.

Top Nozzle Attaching Structure

As best seen in FIGS. 8-11, the attaching structure 40 of the reconstitutable fuel assembly 10 includes a plurality of outer sockets 42 defined in the top nozzle adapter plate 24 by the plurality of passageways 38 which each contain an annular circumferential groove 44, a plurality of inner sockets 46 defined on the upper end portions 36 of the guide thimbles 20, and a plurality of removable locking tubes (not shown) inserted in the inner sockets 46 to maintain them in locking engagement with the outer sockets 42. The locking tubes are illustrated in either one of the above two cross-referenced patent applications.

Each inner socket 46 is defined by an annular circumferential bulge 48 on the hollow upper end portion 36 of one guide thimble 20. A plurality of elongated axial slots 50 are formed in the upper end portion 36 of each guide thimble 20 to permit inward elastic collapse of the slotted end portion to a compressed position so as to allow the circumferential bulge 48 thereon to be inserted within and removed from the annular groove 44 via the adapter plate passageway 38. The annular bulge 48 seats in the annular groove 44 when the guide thimble end portion 36 is inserted in the adapter plate passageway 38 and has assumed an expanded position. In such manner, the inner socket 46 of each guide thimble 20 is inserted into and withdrawn from locking engagement with one of the outer sockets 42 of the adapter plate 24.

The locking tubes (not shown) of the attaching structure 40 are inserted from above the top nozzle 14 into their respective locking positions in the hollow upper end portions 36 of the guide thimbles 20 forming the inner sockets 46. When each locking tube is inserted in its locking position, it retains the bulge 48 of the inner socket 46 in the latter's expanded locking engagement with the annular groove 44 and prevents the inner socket 46 from being moved to its compressed releasing position in which it could be withdrawn from the outer socket 42. In such manner, the locking tubes maintain the inner sockets 46 in locking engagement with the outer sockets 42, and thereby the attachment of the top nozzle 14 on the upper end portions 36 of the guide thimbles 20.

Fixture for Removing and Replacing the Top Nozzle

For effectuating inspection, removal, replacement and/or rearrangement of fuel rods 16 contained in the reconstitutable fuel assembly 10, the irradiated assembly must be removed from the reactor core and lowered into a work station 52 by means of a standard fuel assembly handling tool (not shown).

Figure 3:
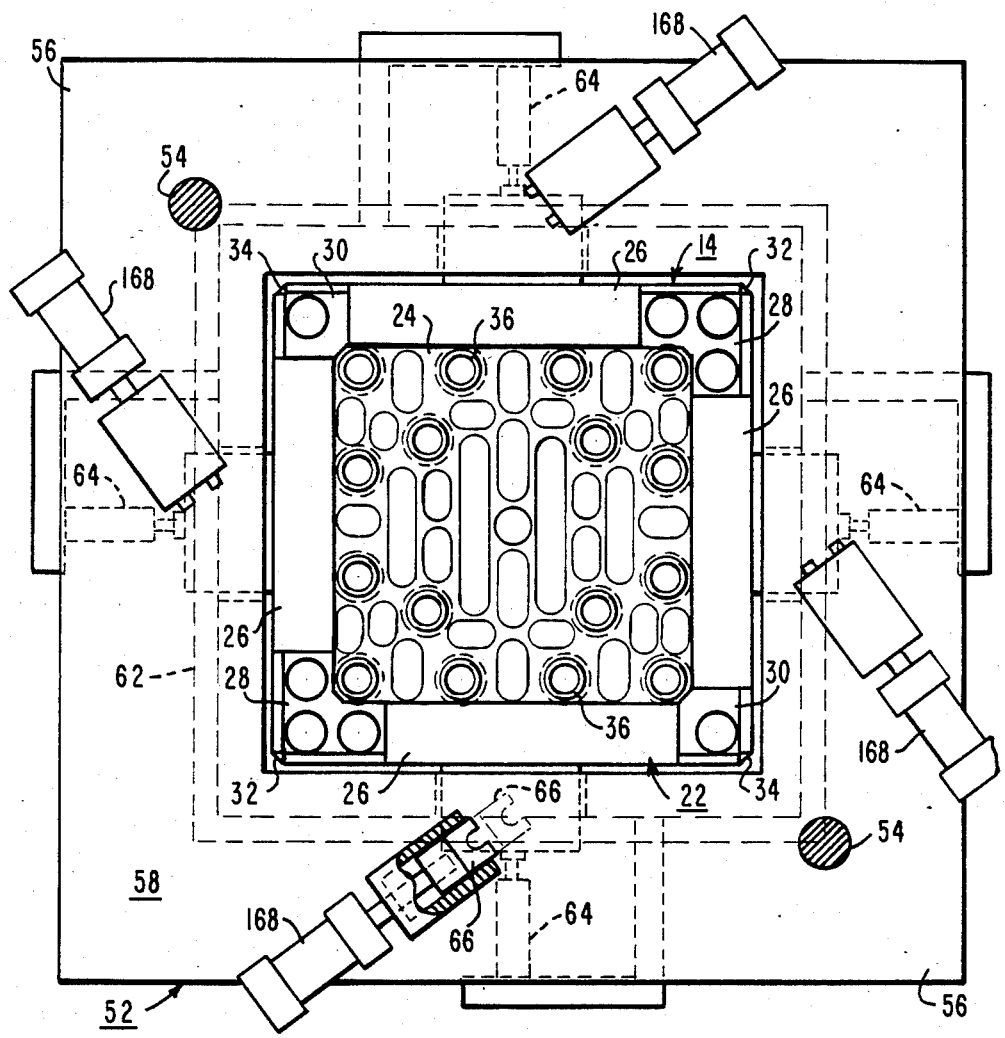
FIG. 3 is a top plan view of the fuel assembly as seen along line 3—3 of FIG. 1 in the direction of the arrows.

In FIGS. 1 and 3, there is illustrated various features in the work station 52 that are used in conjunction with the fixture 12 of the present invention to guide the top nozzle 14 and fixture 12 for proper removal and replacement of the top nozzle. These features include a pair of elongated, bullet-nose guide members 54 which are mounted on, and project upwardly from, a pair of diagonal corners 56 of a top flange 58 of the work station 52. Also, included in the work station 52 are four movable pads 60 that are mounted on and project through the side walls 62 of the work station at the elevation of the uppermost grid 18 of the fuel assembly 10. The pads 60 are advanced inwardly by cylinders 64, also mounted on the side walls 62, to bear against each side of the grid 18 and take up the clearance between the station 52 and the assembly 10, and thus maintain it in a fixed relation to the work station. As will become clear below, maintaining the fixed position of the assembly 10 is particularly important while the top nozzle 14 is off the fuel assembly and from the standpoint of guidance during replacement of the top nozzle. Finally, the work station 52 includes four pneumatic-operated moon-shaped brackets 66 mounted on the top flange 58 which are used in conjunction with the fixture 12 during remounting or replacement of the top nozzle 14.

In the work station 52, the fuel assembly 10 is submerged in coolant and thus maintenance operations are performed by manipulation of remotely-controlled submersible equipment. One component of such equipment is the tool (not shown) for removing the locking tubes which forms the invention illustrated and described in the second patent application cross-referenced above. Removal of the locking tubes represents the first step in removing the top nozzle 14 from the reconstitutable fuel assembly 10. Another component of such equipment is the fixture 12 of the present invention which, after the locking tubes have been removed, is used for removing and subsequently replacing the top nozzle 14 from and on the guide thimbles 20 of the reconstitutable fuel assembly 10.

Figure 2:
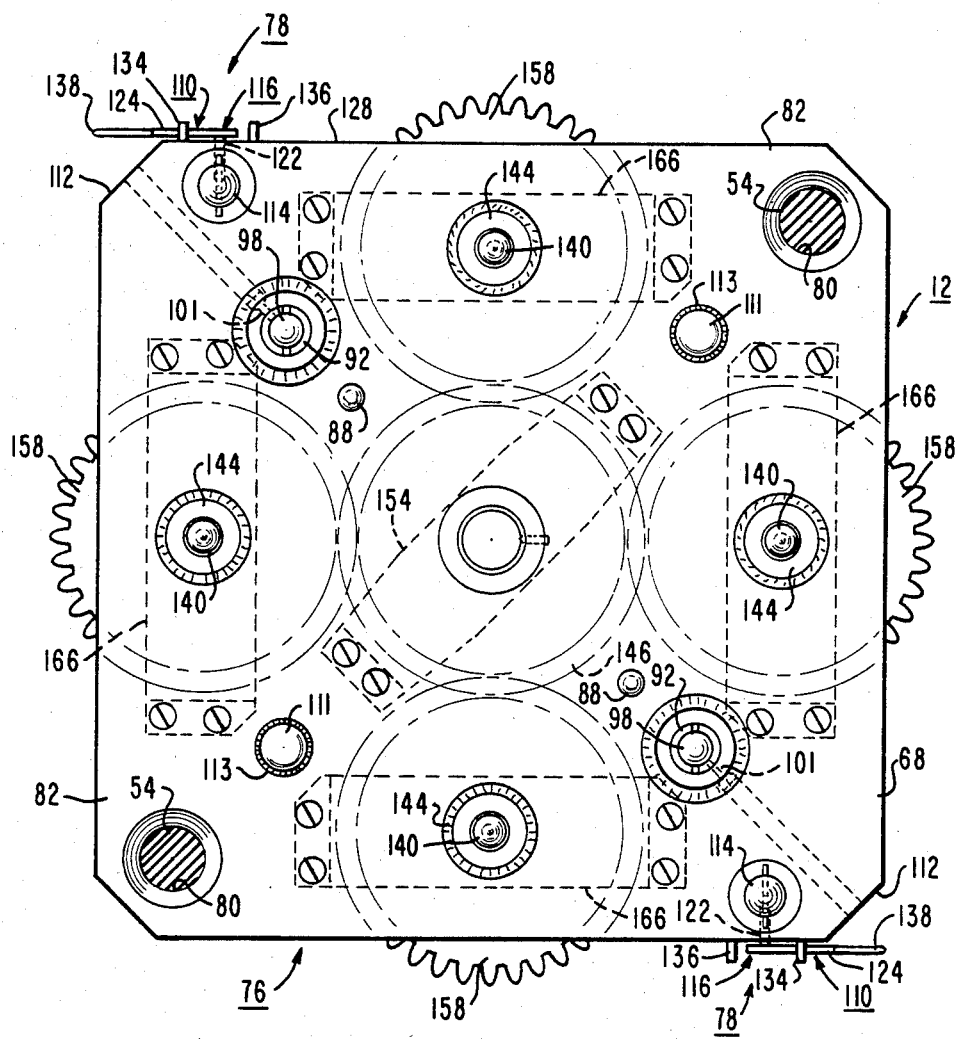
FIG. 2 is an enlarged bottom plan view of the fixture as seen along line 2—2 of FIG. 1 in the direction of the arrow.
Figure 4:
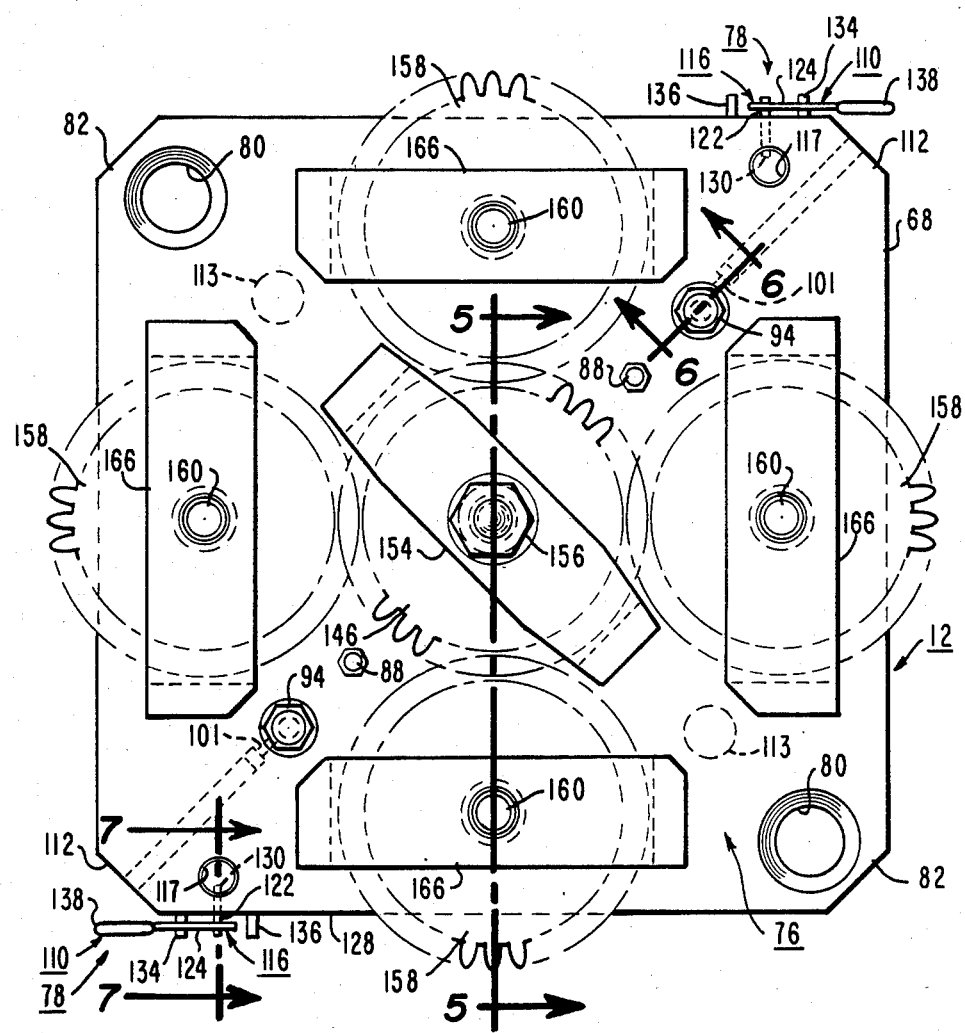
FIG. 4 is a top plan view of FIG. 1.
Figure 5:
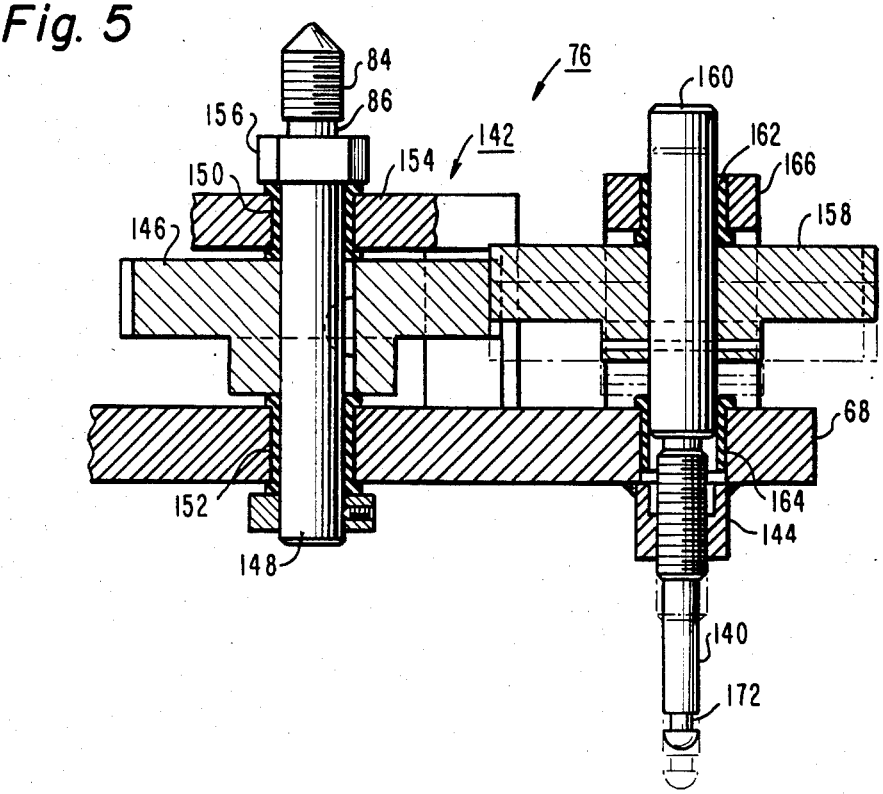
FIG. 5 is an enlarged, fragmentary sectional view of the fixture taken along line 5—5 of FIG. 4, showing a drive gear coupled to one of the driven gears which in turn is connected to one of the reaction pins of the fixture.

Referring again to FIG. 1 and now also to FIGS. 2 and 4, there is shown various features mounted on a base 68 of the fixture 12 which, when used in conjunction with the work station 52, are useful in both removing and replacing the top nozzle 14 from and back onto the guide thimbles 20 of the fuel assembly 10. Basically, these features on the base 68 of the fixture 12 include guiding means 70, aligning means 72, locking means 74, moving means 76 and reference establishing means 78.

The guiding means 70 preferably takes the form of a pair of holes 80 formed through one pair of diagonal corners 82 of the fixture base 68. The holes 80 are sized to receive the guide members 54 of the work station 52 which project upwardly from the top flange 58 of the station. Thus, when the fixture 12 is engaged by a long-handled tool (not shown), having an internally-threaded bottom end which threads onto the upper threaded end 84 of a central stud 86, and lowered toward the fuel assembly 10 located in the work station 52, as the fixture 12 approaches the station (as seen in FIG. 1) the two holes 80 in diagonally opposite corners 82 of the fixture base 68 will be guided over the two upstanding guide members 54 of the work station.

Soon after the fixture base 68 via its corner holes 80 movably mates with the guide members 54 on the work station top flange 58 and moves downwardly therealong, the aligning means 72 of the fixture 12, which preferably takes the form of two elongated rods 88 positioned along a diagonal of the base 68 on either side of the central stud 86 and having lower conically-tapered heads 90, insert through two of the passageways 38 in the top nozzle adapter plate 24 and into the upper end portions 36 of two guide thimbles 20. Downward movement of the fixture 12 continues until the base 68 and aligning rods 88 reach the position shown in FIG. 8 (only one rod 88 being illustrated for purposes of clarity). In such manner, the fixture 12 also becomes aligned with the top nozzle 14 of the fuel assembly 10 as well as with the top flange 58 of the work station 52 as the fixture base 68 is movably mounted on the work station.

Figure 8:
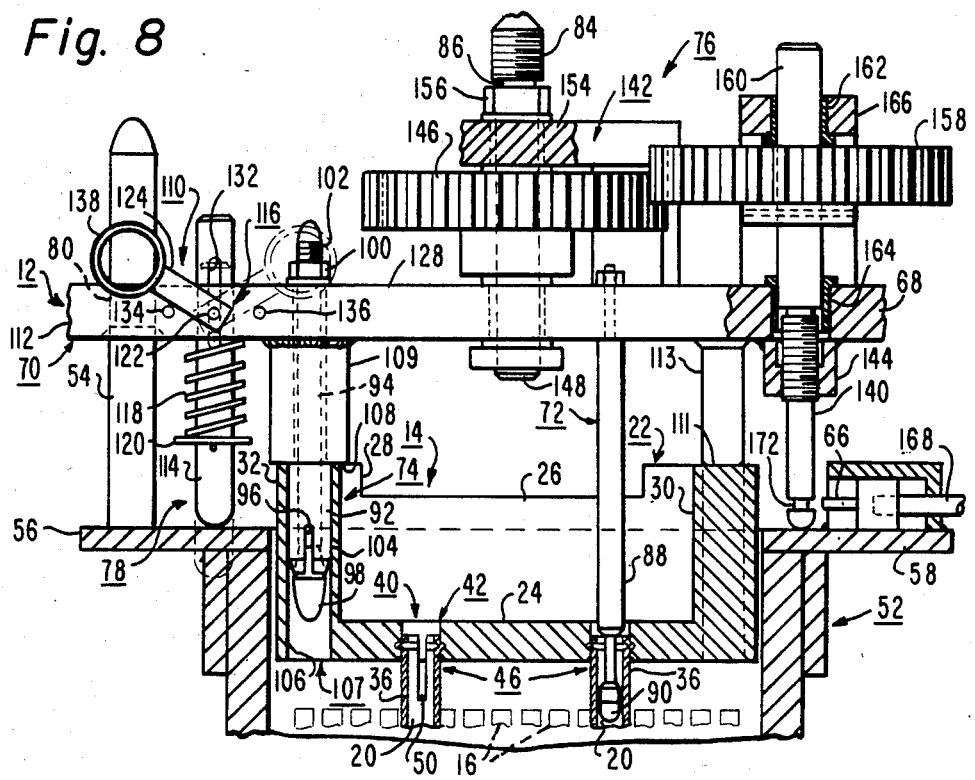
FIG. 8 is a side elevational view, partially in section, of the fixture with certain ones of its operative parts omitted for clarity while other parts identical to the omitted ones are shown in their respective positions on the work station and the fuel assembly being held therein just prior to commencement of the removal of the top nozzle from the guide thimbles of the assembly.

Once the fixture base 68 has lowered to the position shown in FIG. 8, it is properly positioned on the top nozzle 14 for top nozzle removal. Such lowering places the locking means 74 on the fixture base 68 into matable relation with complementary means on the top nozzle 14. The locking means 74 preferably takes the form of a pair of releasable expansion members.

Figure 6:
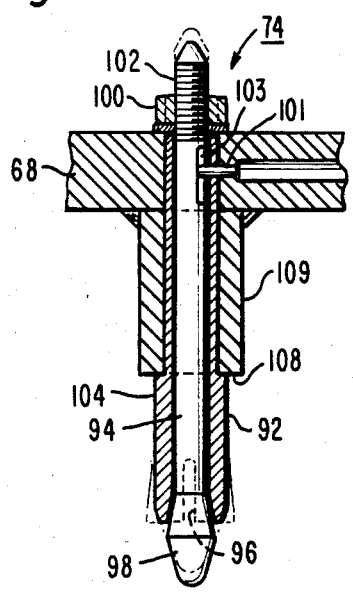
FIG. 6 is an enlarged, fragmentary sectional view of the fixture taken along line 6—6 of FIG. 4, showing one of the hollow expandable split sleeves of the fixture with a wedge pin mounted for axial movement therein.

Referring to FIG. 6 in addition to FIGS. 1 and 2, each expansion member 74 includes a hollow expandable split sleeve 92 and a wedge pin 94 inserted into the sleeve 92 from the lower end. The sleeve 92 is attached at an upper end to the fixture base 68 in diagonal alignment with the alignment rods 88 but radially outward therefrom with respect to the central stud 86 of the fixture 12. The lower end portion of the sleeve 92 contains several axially extending slots 96 which are expandable circumferentially outward (as seen in broken line form in FIG. 6) when a wedge-shaped head 98 on the lower end of the wedge pin 94 is drawn in an upward direction by tightening nut 100 on the threaded upper end 102 of the pin 94. A dowel 101 is inserted through the base 68 into a cutout 103 provided in the pin 94 to prevent the pin 94 from rotating while allowing it to move vertically as the nut 100 is turned.

Expansion of the sleeve 92 creates a tight friction fit between its outer surface 104 and the internal surface 106 of a bore 107 defined in one diagonal corner pad of pair 28 at each diagonal corner of pair 32 of the top nozzle housing side walls 26. The tight friction fit attaches the fixture 12 to the top nozzle 20. On the other hand, loosening the nut 100 moves the wedge pin 94 in an opposite direction, allowing the sleeve 92 to contract and release the frictional engagement with the internal surface 106 of the bore 107 and thus frees the base 68 from the top nozzle 14.

Consequently, once the fixture 12 is resting on the top nozzle 14 as seen in FIG. 8, wherein the lower edges 108 of outer sleeves 109 which are attached to the underside of the base 68 and surround the upper portions of the split sleeves 92 abut upon the corner pads 28 and the lower edges 111 of a pair of corresponding stub shafts 113 which are also attached to the underside of the base 68, but at opposite diagonal corners 34, abut the corner pads 30, the long-handled tool (not shown) is now unthreaded from the upper end 84 of central stud 86 and a similar tool (not shown) with a socket end is used to turn the nut 100 on the upper end 102 of each wedge pin 94. By turning each nut 100 in a clockwise direction, the wedge-shaped head 98 on the lower end of the pin 94 is raised inside the split sleeve 92 which, in turn, expands and thereby locks into the bore 107 with, for example, an applied torque of 20 ft-lbs.

Prior to initiating actual removal of the top nozzle 14 from the guide thimbles 20 of the fuel assembly 10, steps must be taken to ensure that the fixture 12 can be effectively used to remount or replace the top nozzle 14 later back on the fuel assembly 10 at exactly the same axially position thereon. The reference esstablishing means 78 is provided on the fixture base 68 for this purpose. It takes the form of a pair of stop devices 110 mounted on the fixture base 68 adjacent the other pair of diagonal corners 112 of the base.

Figure 7:
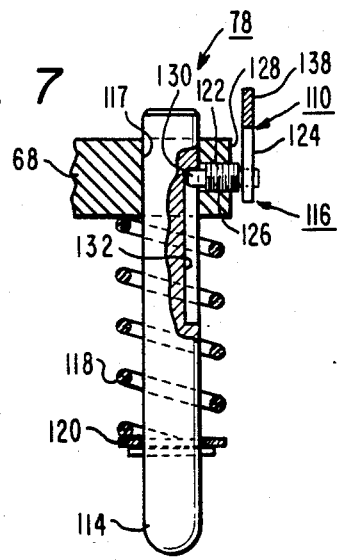
FIG. 7 is an enlarged, fragmentary sectional view of the fixture taken along line 7—7 of FIG. 4, showing one of the spring-biased elongated referenced-establishing members of the fixture.

As depicted in FIG. 7 as well as FIGS. 1, 2 and 4, each stop device 110 includes a spring-loaded, vertically oriented stop pin 114 and a stop pin lock assembly 116. The stop pin 114 projects through an opening 117 in the base 68 and is loaded or biased downwardly by coil spring 118. The spring 118 encircles the pin 114 below the base 68 and is positioned in a state of compression between the base and a lower washer 120 attached to the pin.

The stop pin assembly 116 takes the form of a threaded rod 122 and an actuating arm 124 attached to one end of the rod. The rod 122 is movable through a elongated hole 126 horizontally tapped into the base 68 from its peripheral edge 128 adjacent each diagonal corner 112 so as to intersect the vertically-extending opening 117 in the base through which the stop pin 114 is inserted. By rotating the actuating arm 124, the threaded rod 122 is rotated within the threaded hole 126 which causes the rod to move through the hole, clockwise rotation to advance the rod toward the pin 114 and counterclockwise rotation to retract the rod away from the pin. The inner terminal end 130 of the rod 122 extends into a vertical groove 132 formed in a side of the stop pin 114 which faces the hole 126. Left and right hand limit lugs 134,136 extend radially outward from the peripheral edge 128 of the base 68 on either side of the location of attachment of the actuating arm 124 to the outer end of the rod 122 for defining the extremes of the rotational stroke of the arm 124.

Prior to placing the fixture 12 on the top nozzle 14 in preparation for nozzle removal, the stop devices 110 must be preset so as to function to establish a reference representing the displacement between the fixture base 68 and the top flange 58 of the work station 52 so that the top nozzle 14 can be replaced later at the same axial position on the fuel assembly as it was prior to removal. For facilitating the establishment of such a reference, a ring 138 on the end of each actuating arm 124 is engaged with a long-handled "hook end" tool (not shown) and, with a lifting motion, the actuating arm is pivoted in a counterclockwise direction against the left hand limit lug 134, as seen in FIG. 1. This action causes the threaded rod 122 to rotate in the tapped hole 126 and to move away from the groove 132 in the stop pin 114 to an unlocked position.

As the fixture 12 is subsequently lowered onto the top nozzle 14 to the position of FIG. 8, each spring-loaded stop pin 114, regardless of the specific length of the assembly 10, maintains contact with the top flange 58 of the work station 52. Thus, when the fixture 12 is resting in its desired place on the top nozzle 14, the extent of each pin 114 establishes a reference representing the vertical dimension from the work station flange 58 to the fixture base 68.

After the fixture 12 has been locked to the top nozzle 14, the stop pins 114 are immobilized by again using the aforementioned long-handled hook-end tool. The ring 138 on each actuating arm 124 is engaged, lifted and pivoted against the right hand limit lug 136 (from the solid line position to the broken line position in FIG. 8) which rotates the stop pin lock rod 122 in a clockwise direction and advances it to a locked position into contact with the side of the pin 114 within the groove 132. The pressure of the inner terminal end 130 of the threaded rod 122 against the stop pin 114 prevents vertical movement of the stop pin during subsequent top nozzle removal and remounting operations, thus preserving the reference dimension between the work station top flange 58 and the fixture base 68. The location of the right hand limit lug 136 allows adequate rod pressure to hold the stop pin 14, while preventing an excessive degree of rotation that could damage the stop devices 110.

During the period while the top nozzle 14 is removed, held in temporary storage, and then remounted to the fuel assembly 10, the stop devices 110 remain in the locked positions. This ensures that the remounted top nozzle 14 is axially in an identical position to that prior to removal as established by the reference dimension from the work station top flange 58 to the fixture base 68.

Finally, after the axial height reference has been established, the moving means 76 is operated to remove the top nozzle 14 locked to the fixture base 68 from the fuel assembly. Specifically, the moving means 76 on the base 68 engages the top flange 58 of the work station 52 and lifts the base 68 and top nozzle 14 locked thereto away from the top flange. Such action causes release of the attaching structures 40 mating the top nozzle adapter plate 24 to the upper end portions 36 of the guide thimbles 20.

Preferably, as seen in FIGS. 1, 2, 4 and 5, the moving means 76 includes a plurality of elongated reaction pins 140 and drive means 142 for moving the pins. The reaction pins 140 extend from the base 68 downwardly toward the top flange 58 when the base is movably mounted on the work station. Each of the reaction pins 140 is threadably coupled through an internally threaded hub 144 fixed to the underside of the base 68 such that upon rotation the pins also move vertically relative to the base.

The drive means 142 includes a centrally-located drive gear 146 keyed to a central shaft 148 which is mounted for rotation about a vertical axis by bushings 150,152 respectively supported on the base 68 and on an inverted U-shaped bracket 154 which, in turn, is mounted on the base 68. A nut 156 providing a tool surface for turning the shaft 148 is integrally connected with the upper end of the shaft as is the earlier-mentioned central stud 86 used for lifting the fixture 12. The drive means 142 also includes a plurality of driven gears 158, preferably four in number corresponding to the four reaction pins 140 which are used on the fixture 12. Each driven gear 158 is mounted in intermeshed relationship with the drive gear 146 and at a position circumferentially displaced about the drive gear approximately ninety degrees from one another, as most clearly seen in FIGS. 2 and 4. Furthermore, each driven gear 158 is affixed to a shaft 160 which is mounted for rotation about a vertical axis by bushings 162,164 respectively supported on the base 68 and on an inverted U-shaped bracket 166 which, in turn, is mounted on the base. The reaction pins 140 are each integrally connected at its upper end to the lower end of one of the driven gear shafts 160 so as to rotate therewith.

The arrangement of the drive means 142 with the reaction pins 140 must provide for translation of rotational motion of the drive gear 146 into movement of the reaction pins 140 along linear paths due to the threaded mounting of the pins in the hubs 144. To accommodate such requirement, the teeth of the respective driven gears 158 intermesh with the teeth of drive gear 146 so as to allow the driven gears to slidably move vertically in linear fashion with respect to the drive gear concurrently as the driven gears are rotated by the drive gear. Such vertically sliding capability of the driven gears 158 relative to the drive gear 146 can be seen by comparing FIG. 8 to FIG. 9 and FIG. 10 to FIG. 11.

Figure 9:
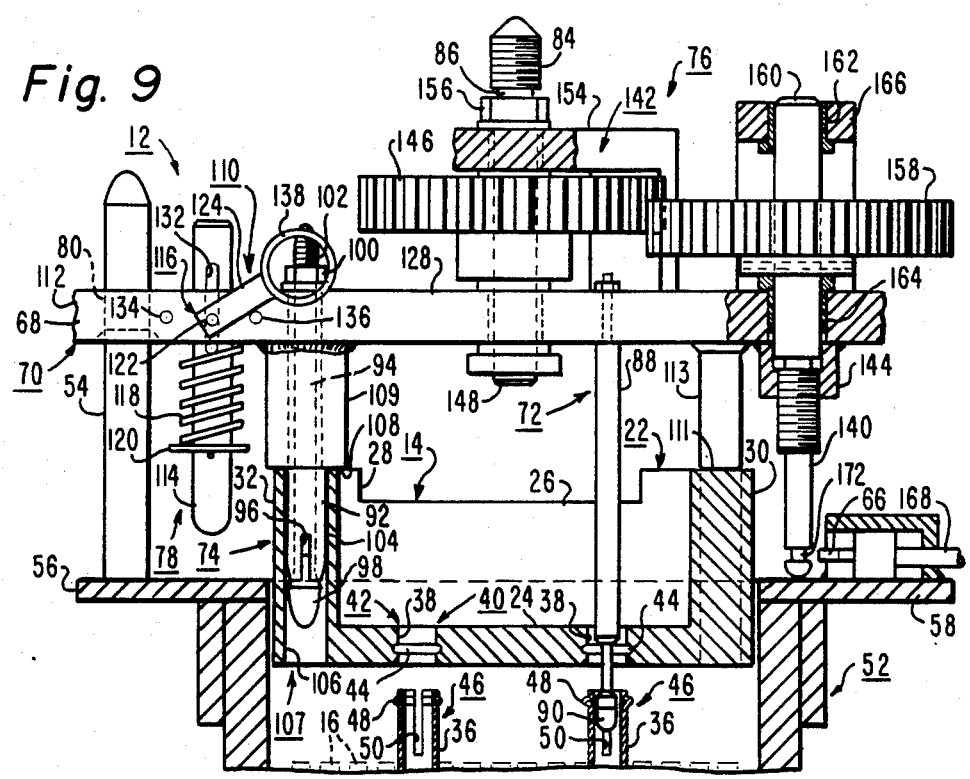
FIG. 9 is a view similar to that of FIG. 8, but showing the respective positions of the parts of the fixture after removal of the top nozzle from the guide thimbles of the assembly has been completed.
Figure 10:
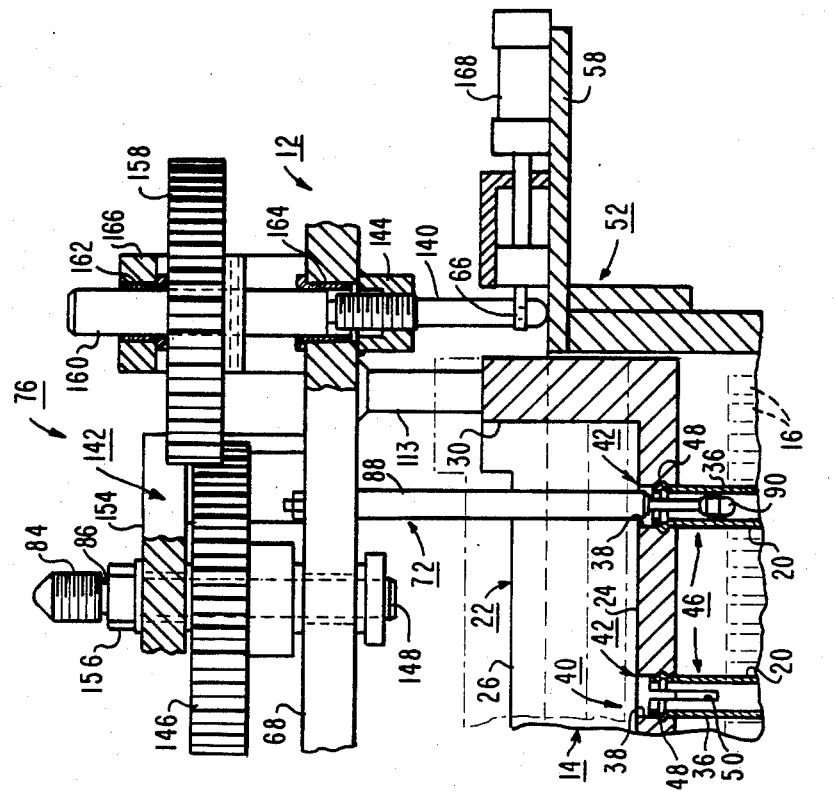
FIG. 10 is a fragmentary side elevational view, partially in section, of the fixture with certain ones of its operative parts being shown in their respective positions on the work station and the fuel assembly just prior to replacement of the top nozzle back onto the guide thimbles of the assembly.
Figure 11:
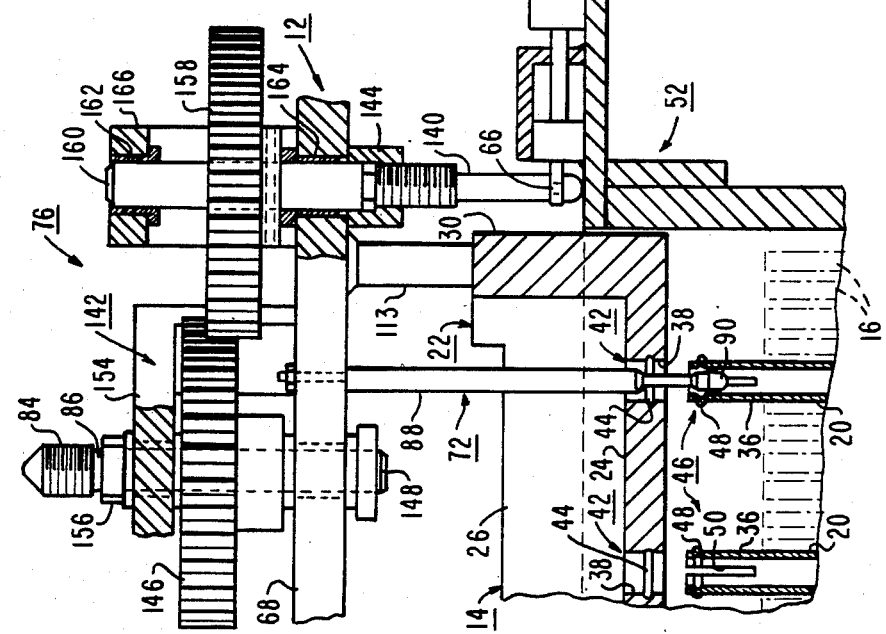
FIG. 11 is a view similar to that of FIG. 10, but showing the respective positions of the parts of the fixture after replacement of the top nozzle back onto the guide thimbles of the assembly has been completed.

For removing the top nozzle 14 from the fuel assembly 10 after the nozzle is locked to the fixture 12, a long-handled socket end tool (not shown) is engaged with the hex nut 156 on the upper end of the central shaft 148 and is turned in counterclockwise direction. This action turns the drive gear 146 and simultaneously rotates the driven gears 158 and drives the reaction pins 140 rotatably and linearly downward against the top flange 58 of the work station 52. There the drive force is reacted, raising the top nozzle 14 with the fixture 12 in a contolled, stepless manner and causing the upper end portions 36 of the guide thimbles to collapse inwardly and release the locking engagement of their annular bulges 48 in the annular grooves 44 within the respective passageways 38 of the top nozzle adapter plate 24. A noticeable reduction in torque (from 5 ft-lbs to less than 1 ft-lb) occurs when the adapter plate 24 is free of the guide thimbles 14, as seen in FIG. 9. The turning action of the tool is continued until the limit of the gear arrangement mechanical travel is reached.

The fixture 12 with the attached top nozzle 14 is then carefully removed from the work station 52 and transferred to temporary storage by means of the earlier-mentioned, long-handled, threaded-end tool engaged with the upper threaded end 84 of the central stud 86.

Remounting of the top nozzle 14 is substantially the reverse of the removal procedure and uses the same features. However, one additional component is needed—some means to hold the lower ends of the reaction pins 140 so that the adapter plate 24 of the top nozzle 14 can be driven down upon the upper end portions 36 of the guide thimbles 20. As seen in FIG. 3, such means is provided in the form of a plurality of actuators 168, preferably four in number corresponding to the number of reaction pins 140 and being pneumatic cylinders, having moon-shaped brackets 66 attached to their piston rod extensions and movable between the solid line and dashed line positions. When the fixture 12 and top nozzle 14 are lowered to the positions seen in FIG. 10, operation of the actuators 168 advances the brackets 66 against reduced diameter sections 172 on the respective reaction pins 140. The brackets 66 take the reactions transmitted through the pins 140 as the top nozzle adapter plate 24 is forced over the upper end portions 36 of the guide thimbles 20 by turning the drive gear 146 in a clockwise direction.

The top nozzle 14 has been lowered to its final assembly elevation when the lower ends of the stop pins 114 contact the top flange 58 of the work station 52. At such elevation the annular bulges 48 on the guide thimbles 20 are seated in the annular grooves 44 in the adapter plate passageways 38. Once such seating relationship has been reached, the actuators 168 are operated to retract the brackets 66. The fixture 12 is then unlocked from the top nozzle 14, and the fixture 12 is lifted off the nozzle and transferred to temporary storage.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In combination with a reconstitutable fuel assembly being held in a fixed position within a work station wherein said fuel assembly includes a top nozzle with an adapter plate having at least one passageway, at least one guide thimble with an upper end portion and an attaching structure releasably mating said upper end portion of said guide thimble within the passageway of said top nozzle adapter plate, said guide thimble being held in said fixed position, a fixture for removing and replacing said top nozzle from and to said guide thimble, comprising:

(a) a base;
(b) means for movably mounting said base on said work station in alignment with said top nozzle of said fuel assembly;
(c) means for locking said top nozzle to said base when said base is movably mounted on said work station;
(d) means for moving said base, and said top nozzle therewith when locked thereto, relative to said work station so as to lift said top nozzle away from said guide thimble and thereby cause release of said attaching structure and removal of said top nozzle from said guide thimble and so as to lower said top nozzle toward said guide thimble and thereby cause mating of said attaching structure and replacement of said top nozzle back on said guide thimble, said moving means including
 (i) a plurality of elongated reacton pins extending from said base to said work station when said base is movably mounted on said work station, and
 (ii) drive means rotatably mounted on said base and coupled to said reaction pins such that rotation of said drive means in a first sense results in removal of said top nozzle from said fuel assembly by causing relative movement of said base and said reaction pins in opposite directions respectively away from and toward said work station, and thereby movement of said base, and said top nozzle therewith when locked thereto, away from said guide thimble after said reaction pins have made abutting engagement with said work station; and
(e) means for gripping said reaction pins and anchoring them in stationary relation to said work station such that rotation of said drive means in a second, opposite sense results in replacement of said top nozzle back onto said fuel assembly by causing relative movement of said base and reaction pins in opposite directions respectively toward and away from said work station and thereby said base, and said top nozzle therewith when locked thereon, toward said guide thimble when said reaction pins are anchored in said stationary relation to said work station.

2. The fixture as recited in claim 1, further comprising:
(e) means aligning said base with said guide thimble when said base is movably mounted on said work station.

3. The fixture as recited in claim 1, further comprising:
(e) means operable for establishing a reference representing the displacement between said base and said work station when said top nozzle is locked to said base but before said base and top nozzle have been lifted away from said work station for facilitating replacement of said top nozzle back onto said guide thimble at the same axial position on said fuel assembly as it was prior to removal.

4. The fixture as recited in claim 3, wherein said reference establishing means includes:
   at least one elongated member movably mounted on said base and extending toward said work station when said base is movably mounted on said work station, said member being biased for movement away from said base; and
   means on said base engagable with said elongated member and operable for securing it in a fixed position relative to said base.

5. The fixture as recited in claim 1, wherein:
   said reaction pins are threadably coupled to said base such that upon rotation said pins also move relative to said base along linear paths extending in generally transverse relation to said base; and said drive means includes
   a drive gear rotatably mounted on said base, and
   a plurality of driven gears corresponding in number to said plurality of reaction pins, said driven gears being rotatably mounted on said base and connected to said reaction pins, said driven gears also being intermeshed with said drive gear so as to be slidably movable in linear fashion relative to said drive gear concurrently as said driven gears are rotated by said drive gear for translating rotational movement of said drive gear into said movements of said reaction pins along said linear paths.

6. The fixture as recited in claim 1, wherein said locking means includes:
   releasable means mounted on one of said base and said top nozzle and matable with the other thereof for securing said top nozzle to said base.

7. The fixture as recited in claim 6, wherein said releasable means includes a pair of hollow expandable split sleeves fixedly mounted to said base and a pair of wedge pins mounted for axial movement in said respective sleeves, said sleeves being insertable within respective bores defined in said top nozzle such that when so inserted and said wedge pins are moved in a first direction said sleeves expand into frictional engagement with said bores and secure said top nozzle to said base, whereas when said wedge pins are moved in a second, opposite direction said sleeves contract and release the frictional engagement with said bores allowing removal of said base from said top nozzle.

8. In combination with a reconstitutable fuel assembly including a top nozzle with an adapter plate having a plurality of passageways, a plurality of guide thimbles with upper end portions and a plurality of attaching structures releasably mating said upper-end portions of said guide thimbles within said passageways of said top nozzle adapter plate, and also with a work station having a top flange, guide members mounted on said flange, and positioning means holding said fuel assembly in a fixed position relative to said work station, a fixture for removing and replacing said top nozzle from and to said guide thimbles, comprising:
   (a) a fixture base;
   (b) means on said base movably matable with said guide members of said work station for guiding said base into alignment with the top nozzle of the fuel assembly;
   (c) means on said base matable with said top nozzle of said fuel assembly and operable for locking said base thereto;
   (d) means on said base engagable with said top flange of said work station and operable for respectively lifting and lowering said base and said top nozzle locked thereto away from and toward said top flange so as to cause release of said attaching structures and unmating of said top nozzle adapter plate from said upper end portions of said guide thimbles and thereby removal of said top nozzle from said fuel assembly and so as to cause reengagement of said attaching structures and mating of said top nozzle adapter plate to said upper end portions of said guide thimbles and thereby replacement of said top nozzle back onto said fuel assembly; and
   (e) means on said base operable for establishing a reference representing the displacement between said base and said work station when said top nozzle is locked to said base but before said base and top nozzle have been lifted away from said top flange for facilitating replacement of said top nozzle back onto said guide thimbles at the same axial position on said fuel assembly as it was prior to removal, said reference establishing means including
      (i) a plurality of elongated members movably mounted on said base and extending toward said top flange of said work station when said base is movably mounted on said work station, said members being biased for movement away from said base; and
      (ii) means on said base engagable with said elongated members and operable for securing them in fixed positions relative to said base.

9. The fixture as recited in claim 8, further comprising:
   (e) means on said base aligning said base with at least some of said guide thimbles when said base is movably mounted on said work station.

10. The fixture as recited in claim 8, wherein said engagable means includes:
    a plurality of elongated reaction pins extending from said base toward said top flange of said work station when said base is movably mounted on said work station; and
    drive means rotatably mounted on said base and coupled to said reaction pins such that rotation of said drive means in a first sense results in removal of said top nozzle from said fuel assembly by causing relative movement of said base and said reaction pins in opposite directions respectively away from and toward said top flange of said work station, and thereby movement of said base, and said top nozzle therewith when locked thereto, away from said guide thimbles after said reaction pins have made abutting engagement with said top flange.

11. The fixture as recited in claim 10, further comprising:
    means on said top flange of said work station for gripping said reaction pins and anchoring them in stationary relation to said top flange such that rotation of said drive means in a second, opposite sense results in replacement of said top nozzle back onto said fuel assembly by causing relative movement of said base and reaction pins in opposite directions respectively toward and away from said top flange and thereby said base, and said top nozzle therewith when locked thereon, toward said guide thimbles when said reaction pins are anchored in said stationary relation to said top flange of said work station.

12. The fixture as recited in claim 10, wherein:

said reaction pins are threadably coupled to said base such that upon rotation said pins also move relative to said base along linear paths extending in generally transverse relation to said base; and said drive means includes a drive gear rotatable mounted on said base, and a plurality of driven gears corresponding in number to said plurality of reaction pins, said driven gears being rotatably mounted on said base and connected to said reaction pins, said driven gears also being intermeshed with said drive gear so as to be slidably movable in linear fashion relative to said drive gear concurrently as said driven gears are rotated by said drive gear for translating rotational movement of said drive gear into said movements of said reaction pins along said linear paths.

13. The fixture as recited in claim 8, wherein said locking means includes:

releasable means mounted on one of said base and said top nozzle and matable with the other thereof for securing said top nozzle to said base.

14. The fixture as recited in claim 13, wherein said releasable means includes a pair of hollow expandable split sleeves fixedly mounted to said base and a pair of wedge pins mounted for axial movement in said respective sleeves, said sleeves being insertable within respective bores defined in said top nozzle such that when so inserted and said wedge pins are moved in a first direction said sleeves expand into frictional engagement with said bores and secure said top nozzle to said base, whereas when said wedge pins are moved in a second, opposite direction said sleeves contract and release the frictional engagement with said bores allowing removal of said base from said top nozzle.

15. In combination with a reconstitutable fuel assembly being held in a fixed position within a work station wherein said fuel assembly includes a top nozzle with an adapter plate having at least one passageway, at least one guide thimble with an upper end portion and an attaching structure releasably mating said upper end portion of said guide thimble within said passageway of said top nozzle adapter plate, a method for removing and replacing said top nozzle from and to said guide thimble, comprising the steps of:

(a) movably mounting a fixture on said work station in alignment with said top nozzle of said fuel assembly;

(b) locking said top nozzle to a base of said fixture;

(c) engaging a plurality of reaction pins movably mounted on said base with said work station;

(d) moving said base, and said top nozzle therewith when locked thereto, relative to said reaction pins and away from said work station so as to lift said top nozzle off said guide thimble and thereby cause release of said attaching structure and removal of said top nozzle from said fuel assembly;

(e) gripping and anchoring said reaction pins in a stationary relation with said work station; and (f) moving said base, and said top nozzle therewith being locked thereto, relative to said reaction pins and toward said work station so as to lower said top nozzle back onto said guide thimble and thereby cause reengagement of said attaching structure and replacement of said top nozzle back onto said fuel assembly.

16. The method as recited in claim 15, further comprising the step of:

(e) establishing a reference representing the displacement between said base of said fixture and said work station when said top nozzle is locked to said base but before said base and top nozzle have been lifted away from said work station for facilitating replacement of said top nozzle back onto said guide thimble at the same axial position on said fuel assembly as it was prior to removal.

* * * * *